W. DOUGLAS.
CYCLE.
APPLICATION FILED JAN. 22, 1918.

1,272,399.

Patented July 16, 1918.
3 SHEETS—SHEET 1.

W. DOUGLAS.
CYCLE.
APPLICATION FILED JAN. 22, 1918.

1,272,399.

Patented July 16, 1918.
3 SHEETS—SHEET 2.

Inventor;
William Douglas,
By Wm E. Poulter, attorney

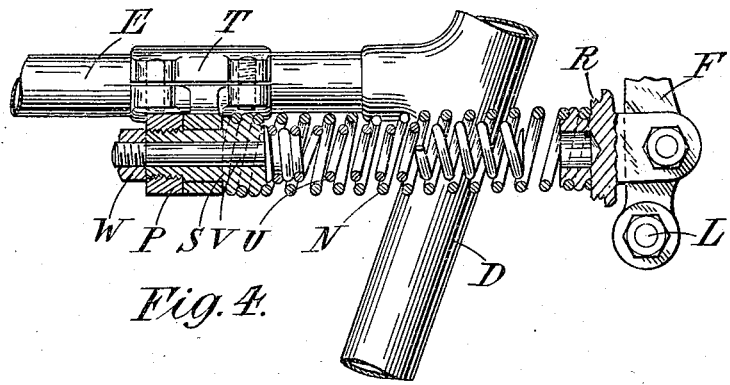
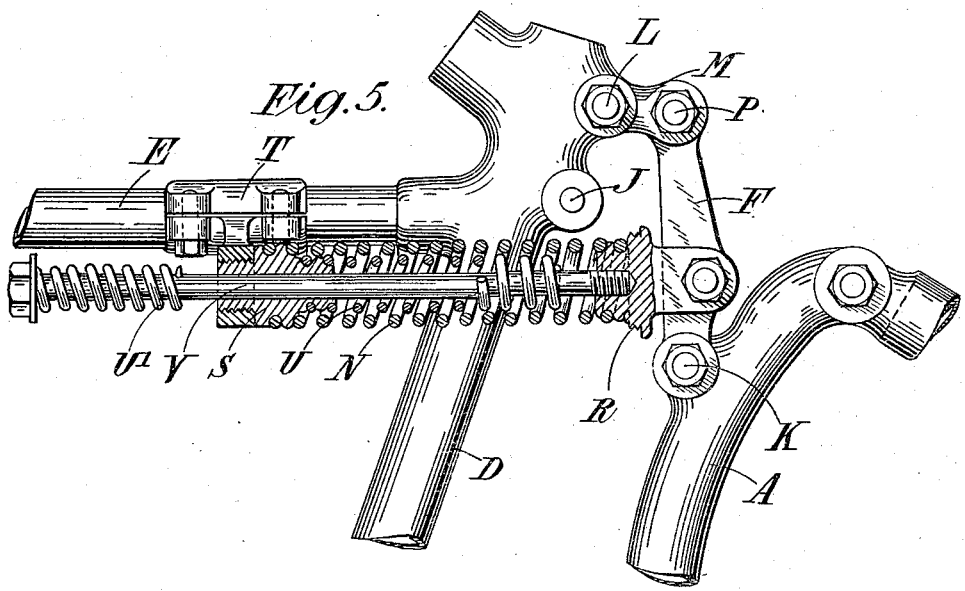
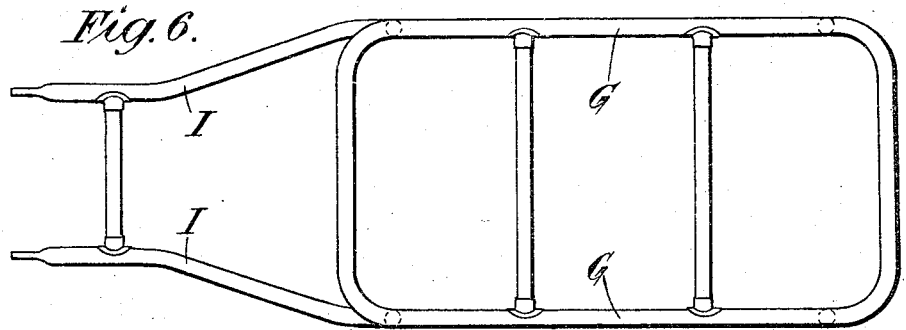

UNITED STATES PATENT OFFICE.

WILLIAM DOUGLAS, OF BRISTOL, ENGLAND.

CYCLE.

1,272,399.

Specification of Letters Patent.

Patented July 16, 1918.

Application filed January 22, 1918. Serial No. 213,247.

*To all whom it may concern:*

Be it known that I, WILLIAM DOUGLAS, a subject of the King of England, residing at Bristol, in England, have invented certain new and useful Improvements in Cycles, of which the following is a specification.

This invention relates to improvements in spring frames for cycles, of the kind in which the back fork frame is pivoted to the lower part of the main frame, and one or more links are pivoted to the upper part of the main frame and to the back fork frame so as to form with the latter a toggle having an angle of nearly 180°. A feature of the present invention is that a shock absorber is operatively connected between the main frame and a point intermediate the ends of said links.

Several embodiments of the invention are illustrated in the accompanying drawings in which:

Fig. 4 is a section showing a modified construction of shock absorber,

Fig. 5 is a section of a further modification, and

Fig. 6 is a plan of the carrier shown in Fig. 1.

Figure 1:
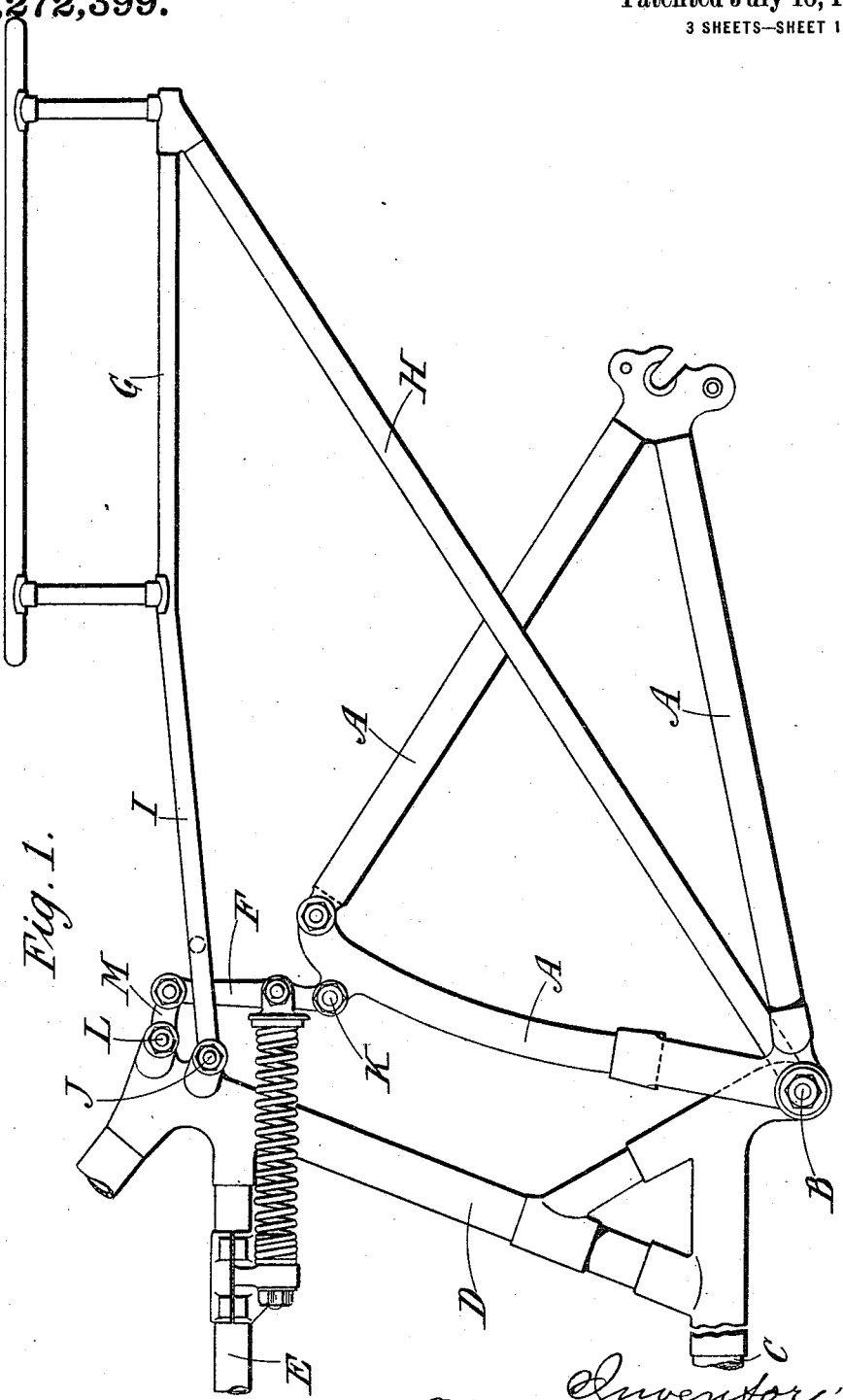
Figure 1 is a side elevation of the rear part of a cycle.
Figure 2:
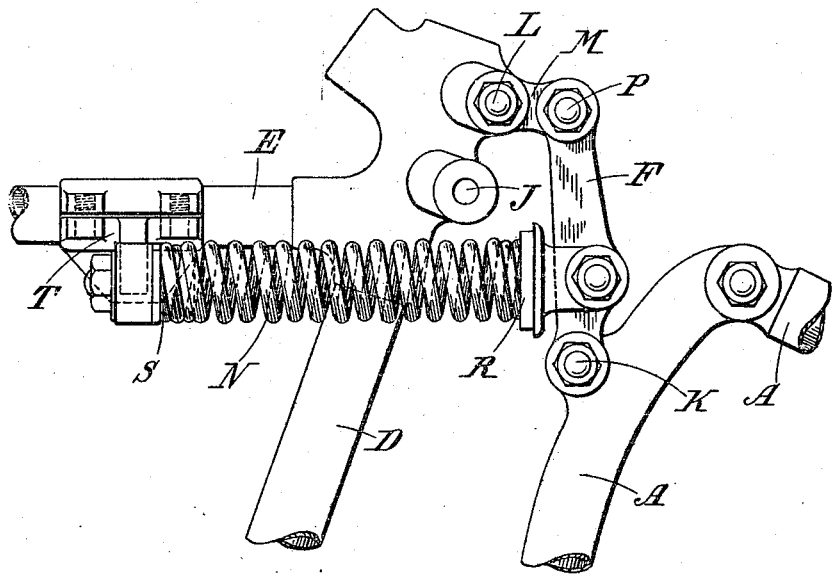
Fig. 2 is an enlarged side elevation of the shock absorber shown in Fig. 1.
Figure 3:
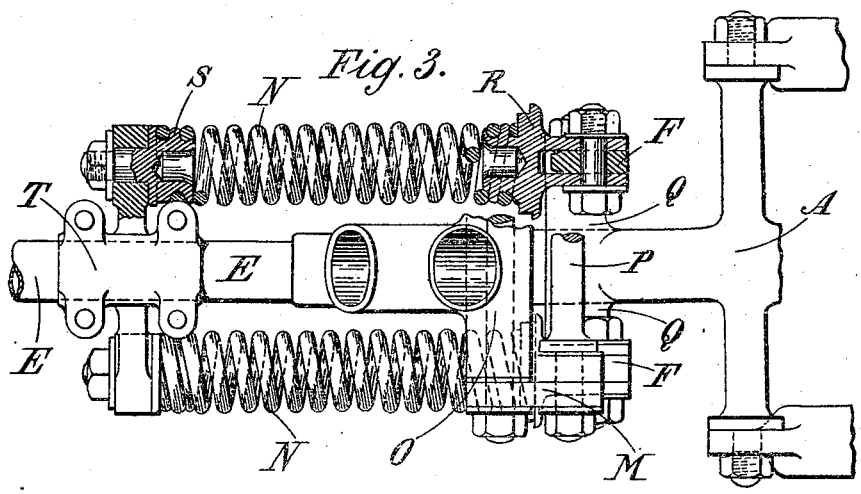
Fig. 3 is a plan partly in section of the said shock absorber.

A is a back fork frame pivoted at B to the lower part of the main frame of which C is a lower horizontal member, D is the seat pillar, and E is an upper horizontal member. F are toggle links connecting the back fork frame to the upper part of the main frame and supporting the former laterally. A carrier platform G is supported on struts H connected between the rear end of the platform and the pivot B, while tie members I connect the platform to a lug J on the upper part of the seat pillar D. The toggle links F are pivoted at K to bosses Q on the back fork frame (see Fig. 3), and are pivoted at L to the upper part of the seat pillar D through short connecting links M. A shock absorber spring N is pivoted intermediate the ends of each link F and is connected at the other end to the member E of the main frame.

Bosses O (see Fig. 3) extend on each side of the seat pillar D and the connecting links M are pivoted thereto. A pin P connects the other ends of the connecting links to the upper ends of the toggle links F. Each spring N is held at one end by a plug R pivoted to a toggle link F, and at the other end by a plug S connected to a clamp T on the member E. Each spring N is adapted to act both in tension and compression.

Instead of employing the connecting links M, the toggle links F can be pivoted in a rubber bushing in the upper part of the main frame so as to provide for the slight vertical movement of the toggle links which takes place when the back fork frame oscillates on its pivot. Instead of employing a rubber bushing, the toggle links can be pivoted eccentrically on a pin carried on the main frame in an ordinary bushing.

Referring to the modified construction illustrated in Fig. 4, an auxiliary spring U is provided and is adapted to act only in compression, and when heavy loads are imposed on the mechanism. This spring U is carried on an auxiliary plug V which is connected to the plug S by a nut W, the plug S being held on the clamp T by a nut X.

In Fig. 5 an additional auxiliary spring $U^1$ is shown which can act only in compression. This spring $U^1$ is carried on a rod Y which passes freely through the plug S—which is screwed into the clamp T and carries the springs N and U—and is screwed into the plug R. The compression spring $U^1$ comes into operation only when the spring N has been to some extent subjected to tension. The constructions illustrated in Figs. 4 and 5 provide a light spring effect for light loads, while the auxiliary springs afford additional support when heavy loads are imposed on the mechanism.

What I claim as my invention and desire to secure by Letters Patent is:—

1. In a cycle frame the combination of a main frame, a back fork frame pivoted to the lower part of said main frame, links pivoted to the upper part of said main frame and to said back fork frame so as to form with the latter a toggle having an angle of nearly 180°, a shock absorber operatively connected between said main frame and a point intermediate the ends of said links, a rear carrier platform, struts connected to said platform and to the lower part of said main frame where pivoted to said back fork frame, and tie members connecting said platform with the upper part of said main frame.

2. In a cycle frame the combination of a main frame, a back fork frame pivoted to the lower part of said main frame, links pivoted to the upper part of said main frame and to said back fork frame so as to form with the latter a toggle having an angle of nearly 180°, a cylindrical helical spring operatively connected between said main frame and a point intermediate the ends of said links, a rear carrier platform, struts connected to said platform and to the lower part of said main frame where pivoted to said back fork frame, and tie members connecting said platform with the upper part of said main frame.

3. In a cycle frame the combination of a main frame, a back fork frame pivoted to the lower part of said main frame, links pivoted to the upper part of said main frame and to said back fork frame so as to form with the latter a toggle having an angle of nearly 180°, a cylindrical helical spring operatively connected between said main frame and a point intermediate the ends of said links, an auxiliary cylindrical helical spring axially in alinement with and operatively connected to one end of the first named spring and adapted to be compressed after the first named spring has been stressed to some extent, a rear carrier platform, struts connected to said platform and to the lower part of said main frame where pivoted to said back fork frame, and tie members connecting said platform with the upper part of said main frame.

4. In a cycle frame the combination of a main frame, a back fork frame pivoted to the lower part of said main frame, links pivoted to the upper part of said main frame and to said back fork frame so as to form with the latter a toggle having an angle of nearly 180°, a cylindrical helical spring operatively connected between said main frame and a point intermediate the ends of said links, an auxiliary cylindrical helical spring shorter than the first named spring within which it is located axially and to one end of which it is operatively connected, a rear carrier platform, struts connected to said platform and to the lower part of said main frame where pivoted to said back fork frame, and tie members connecting said platform with the upper part of said main frame.

5. In a cycle frame the combination of a main frame, a back fork frame pivoted to the lower part of said main frame, links pivoted to the upper part of said main frame and to said back fork frame so as to form with the latter a toggle having an angle of nearly 180°, a cylindrical helical spring operatively connected between said main frame and a point intermediate the ends of said links, a rod operatively connected to one end of said spring and passing axially therethrough, an auxiliary cylindrical helical spring operatively connected axially on the outer end of said rod, a rear carrier platform, struts connected to said platform and to the lower part of said main frame where pivoted to said back fork frame, and tie members connecting said platform with the upper part of said main frame.

6. In a cycle frame the combination of a main frame, a back fork frame pivoted to the lower part of said main frame, links pivoted to the upper part of said main frame and to said back fork frame so as to form with the latter a toggle having an angle of nearly 180°, a cylindrical helical spring operatively connected between said main frame and a point intermediate the ends of said links, a rod operatively connected to one end of said spring and passing axially therethrough, an auxiliary cylindrical helical spring operatively connected axially on the outer end of said rod, a second auxiliary cylindrical helical spring shorter than the first named spring within which it is located axially and to one end of which it is operatively connected, a rear carrier platform, struts connected to said platform and to the lower part of said main frame where pivoted to said back fork frame, and tie members connecting said platform with the upper part of said main frame.

In testimony whereof I have signed my name to this specification in the presence of two subscribing witnesses.

WILLIAM DOUGLAS.

Witnesses:
G. J. BAUEN,
JOHN S. ARMSTRONG.

Copies of this patent may be obtained for five cents each, by addressing the "Commissioner of Patents, Washington, D. C."